United States Patent [19]

Peterson et al.

[11] 4,275,649
[45] Jun. 30, 1981

[54] MECHANICAL BUNCHER FOR LEAFY VEGETABLES

[75] Inventors: Donald L. Peterson, Martinsburg, W. Va.; Ajit K. Srivastava, East Lansing; Galen K. Brown, Okemos, both of Mich.

[73] Assignee: The United States of America as represented by the Secretary of Agriculture, Washington, D.C.

[21] Appl. No.: 88,673

[22] Filed: Oct. 26, 1979

[51] Int. Cl.³ .............................................. B65B 13/02
[52] U.S. Cl. ............................................. 100/4; 74/50; 100/7; 100/18; 171/61
[58] Field of Search ................ 100/4, 7, 17, 18, 19 R; 171/61; 74/50

[56] References Cited

U.S. PATENT DOCUMENTS

| | | | |
|---|---|---|---|
| 2,855,058 | 10/1958 | Krier | 171/61 X |
| 2,986,145 | 5/1961 | Vaughan | 100/7 X |
| 3,221,640 | 12/1965 | D'Arrigo | 100/7 X |
| 3,743,024 | 7/1973 | Mayo | 171/61 |
| 3,968,842 | 7/1976 | Puch | 171/61 X |
| 3,989,110 | 11/1976 | Medlock | 171/61 X |
| 4,030,407 | 6/1977 | Jesty | 100/4 |
| 4,037,666 | 7/1977 | Rath | 171/61 X |

FOREIGN PATENT DOCUMENTS 654021 12/1937 Fed. Rep. of Germany ............. 100/7
401574 2/1974 U.S.S.R. ................................... 100/7

OTHER PUBLICATIONS

"The Grower", May 14, 1966, pp. 916–917, Once Over Harvester Has Universal Application.

Primary Examiner—Billy J. Wilhite
Attorney, Agent, or Firm—M. Howard Silverstein; David G. McConnell; Curtis P. Ribando

[57] ABSTRACT

An automatic vegetable buncher for use in combination with a mechanical harvester of leafy green vegetables conveys the greens to a packing station where a pair of packer fingers driven by a novel rectangular motion generator incrementally feeds the greens into one of a plurality of pockets mounted on a rotatable wheel. When a predetermined bunch size is accrued, the wheel rotates to position an empty pocket at the packing station and to advance the vegetable bunch to a device which ties it into a marketable bundle.

10 Claims, 9 Drawing Figures

MECHANICAL BUNCHER FOR LEAFY VEGETABLES

BACKGROUND OF THE INVENTION

1. Field of the Invention

This invention relates to the mechanical harvesting of vegetable crops, particularly leafy green vegetables and other crops which do not grow in discrete marketable units as do celery, head lettuce, cabbage, etc. Whether harvested by hand or mechanically, leafy vegetables are conventionally field collected in bulk bins. Prior to sale to the consumer, they must be manually bound separately into bunches of uniform size.

2. Description of the Prior Art

A basic mechanical vegetable harvester is disclosed in *The Grower* publication ("Once-Over Harvester Has Universal Application," pp. 916-917, May 14, 1966). This device employs a pair of rubberfaced lifting belts pressed tightly together to grip the leafy tops of the plants as they are uprooted or cut at the ground. The lifting belts feed the plants to a conveyor across the rear of the tractor which delivers them into boxes, sacks, or trailers. A similar harvester is shown in Krier et al. (U.S. Pat. No. 2,855,058) wherein the leaves are gathered, cut from the plants, and conveyed upward to a bushel basket by means of parallel endless belts. In another vegetable harvester taught by Medlock et al. (U.S. Pat. No. 3,989,110) green onions are raised from the ground and conveyed through a series of gripping belt assemblies to a receiving tray for subsequent manual sorting and bundling. U.S. Pat. No. 3,968,842 granted to Puch et al. shows a tomato plant harvester wherein parallel gripping belts lift the plants from the ground and convey them to an expandable compartment of a receiving box. Sensing switches actuate mechanisms for expanding the compartment and for shifting an empty box into the position of one that has been filled. Mayo et al. (U.S. Pat. No. 3,743,024) also shows harvesting seedling plants and packing them into shipping cartons. In Rath (U.S. Pat. No. 4,037,666) leafy and woody plants are uprooted and guided along a path by endless conveyor bands to a bundling device. A photosensitive element counts the individual plants exceeding a minimum size standard and actuates the bundling device when a predetermined number has been collected.

A characteristic problem with the aforementioned vegetable harvesters is that they lack the facility to segregate the cut vegetable leaves into uniform bunches which can be shipped directly to the market shelf without further manual handling. Most leafy green vegetables are grown closely together in rows and have substantial variation in leaf size. When they are conveyed to the collecting station as a continuous line of leaves, counting devices such as that employed by Rath would be totally ineffective. The loading boxes of Puch et al. and Mayo et al. are designed for bulk packing, and the sensing mechanisms therein are not sufficiently sensitive to bundle the greens into marketable units.

SUMMARY OF THE INVENTION

We have now invented an apparatus for bunching leafy green vegetables which have been harvested by a mechanical harvester. The apparatus provides a belt assembly for conveying the vegetables to a packing station at which a cycling packing device separates small portions of the vegetables from the conveyor and feeds them into one of several accumulator pockets mounted on a rotatable wheel. When a predetermined quantity of vegetables is accumulated, a sensing element actuates a mechanism to rotate the wheel. This positions another pocket at the packing station and advances the pocket with the accumulated vegetables to a device for securing them into a marketable bunch.

In accordance with this discovery, it is the primary objective of the invention to construct a leafy green vegetable buncher for use in combination with a mechanical harvester.

Another objective of the invention is to provide a buncher which gently and accurately separates freshly cut vegetables into uniformly sized bunches.

It is also an objective of the invention to position the bunches so that they can be automatically bound together in preparation for shipment to the market shelf.

A further objective is to construct a novel mechanical rectangular motion generator for use as the cycling packing device in the preferred embodiment of the invention.

Other objectives and advantages of the invention will become readily apparent from the ensuing description.

DETAILED DESCRIPTION OF THE INVENTION

The present invention was specifically designed for bunching green vegetable leaves which are severed near the crown of the plant during mechanical harvesting. Exemplary vegetables which lend themselves to harvesting in this manner are turnip tops, mustard greens, collard greens, leaf lettuce, Swiss chard, endive, parsley, spinach, dandelion greens, and kale. The invention is sufficiently versatile that it can also be used to bunch stem crops such as asparagus and cut flowers, as well as other crops such as green onions and seedling transplants.

Figure 1:
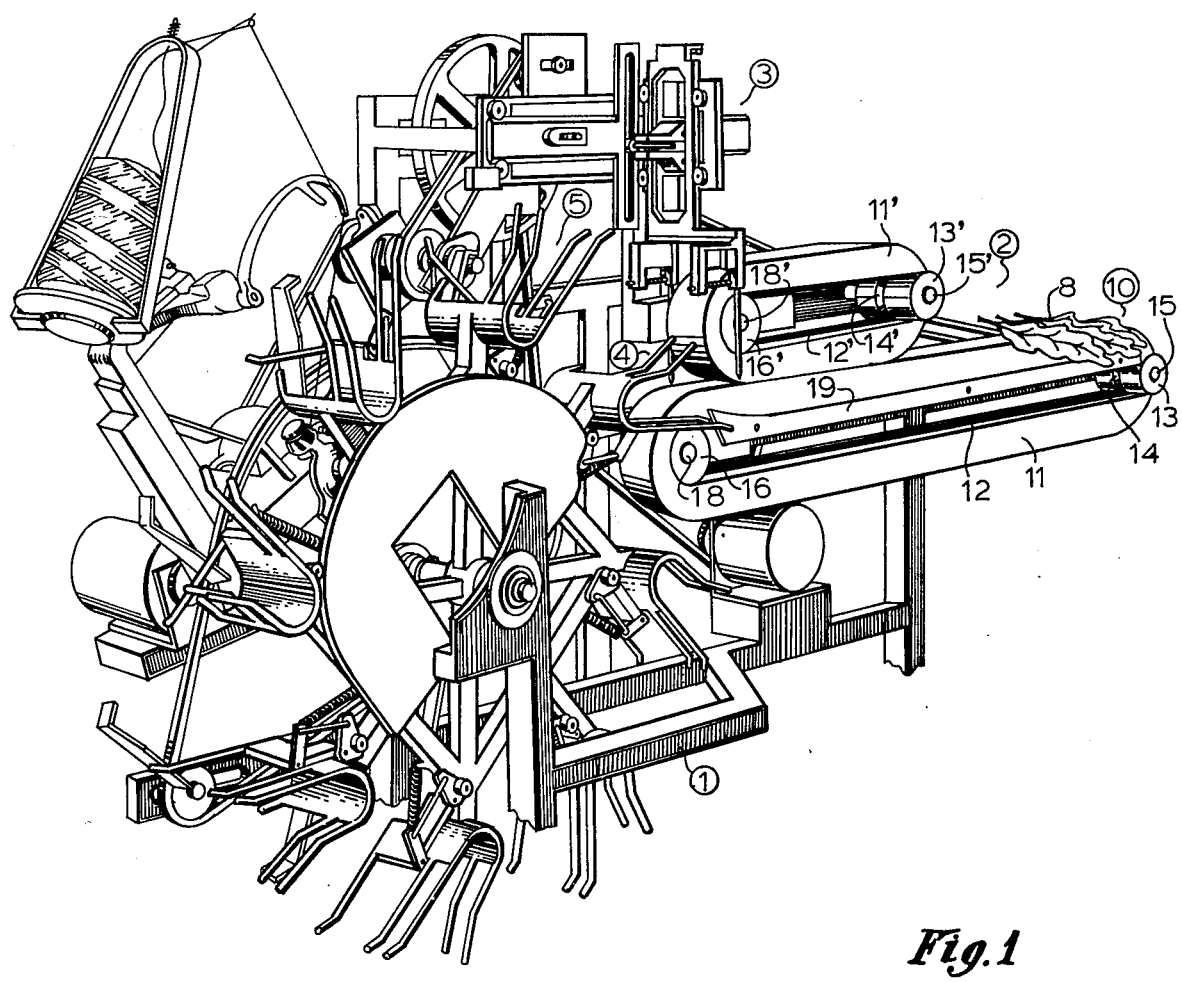
FIG. 1 is a perspective view of the vegetable buncher.
Figure 9:
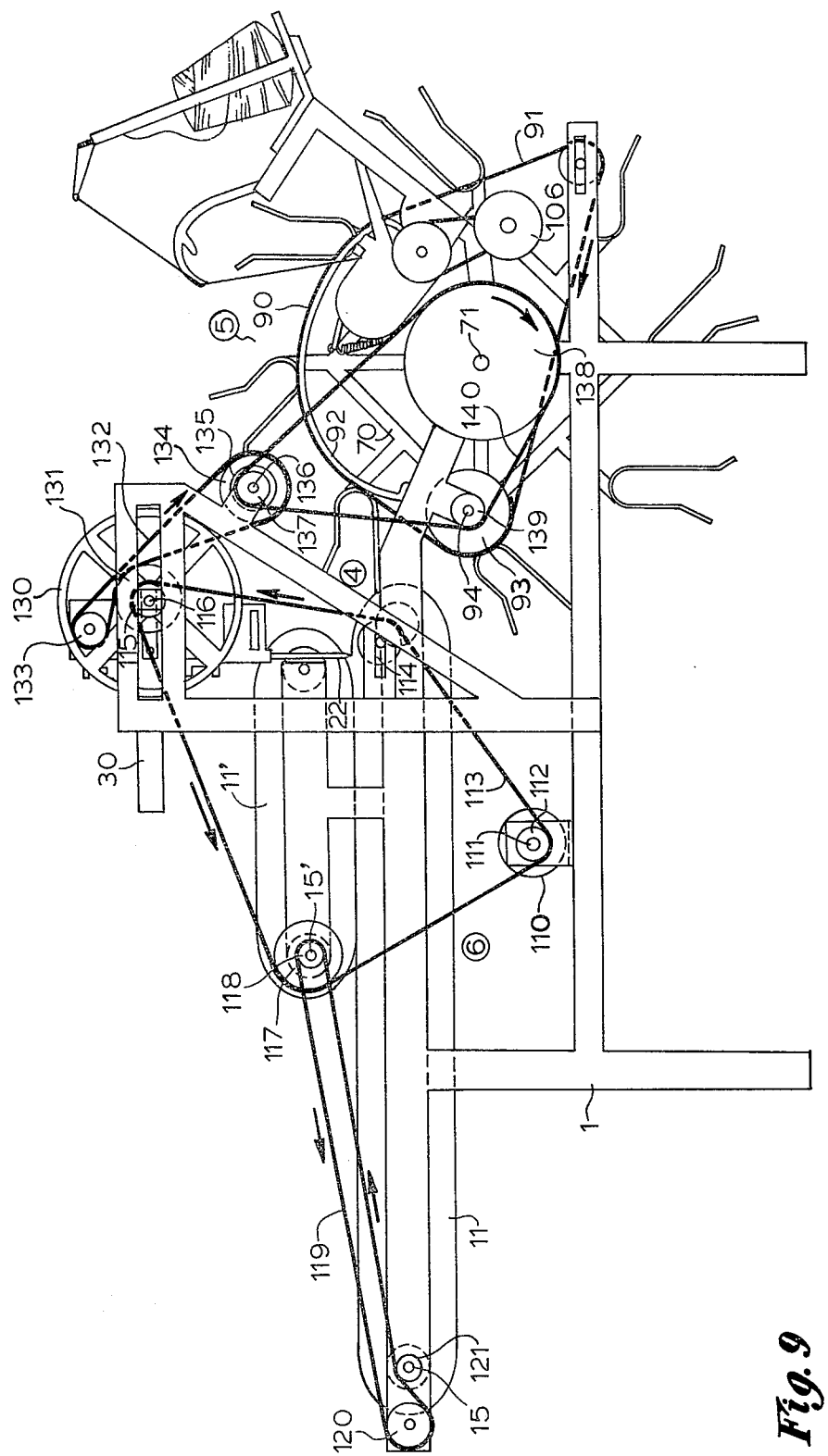
FIG. 9 is a simplified rear elevation of the vegetable buncher, detailing the chain drive mechanism.

Referring now to FIGS. 1 and 9, the vegetable buncher of the present invention generally comprises a frame 1, a conveyor assembly 2, a packing assembly 3, a packing station 4, an accumulator pocket assembly 5, and a chain drive mechanism 6.

The conveyor assembly 2 may be a separate component of the vegetable buncher functioning in cooperation with the conveyor system of the mechanical harvester, or it may be integrated with the harvester's conveyor system. In the preferred embodiment depicted in FIG. 1, the feed end 10 of conveyor assembly 2 receives horizontally oriented cut vegetables 8 from the harvester conveyor (not shown). It is understood that a harvester equipped with a conventional twist belt conveyor would have the capacity of reorienting the vegetables from the vertical growing position to the horizontal feed position. Conveyor assembly 2 comprises a lower flat endless belt 11, which is held trained over driven belt pulley 13 on corresponding shaft 15 and over idler belt pulley 16 on corresponding shaft 18 by endless V-belt 12 affixed to its underside and positioned in V-notch 14 in pulley 13 and in a similar notch (not shown) in pulley 16. Similarly, upper flat endless belt 11' is trained over driven belt pulley 13' on corresponding shaft 15' and over idler belt pulley 16' on corresponding shaft 18' by endless V-belt 12' affixed to its underside and positioned in V-notch 14' in pulley 13' and in a similar notch (not shown) in pulley 16'. The outer surface of belts 11 and 11' are constructed from a soft, spongy material such as open-cell urethane foam which will gently grip the vegetables without damaging them. The lower flight surface of the upper belt runs parallel and in sufficiently close proximity to the upper flight surface of the lower belt in order to firmly grasp the vegetables as they approach the packing station 4. If the belt surfaces are sufficiently soft, they may actually converge upon one another without harming the greens. Belt pulleys 13 and 13' are driven in opposite directions at the approximate ground speed of the mechanical harvester by the chain drive mechanism 6 described later. The section of the lower belt 11 between feed end 10 and the point of convergence with the upper belt 11' serves as an inspection station at which weeds and unacceptable produce may be manually removed from the crop. At the packing station 4, the lower belt 11 extends beyond the upper belt 11' so that the greens may be freely supported from the bottom while being fed into the accumulator pockets as described in more detail below. Retention bar 19 assists in supporting the ends of the greens as they are conducted into the pockets. A similar bar may be incorporated on the opposite side of belt 11 if necessary.

Figure 2:
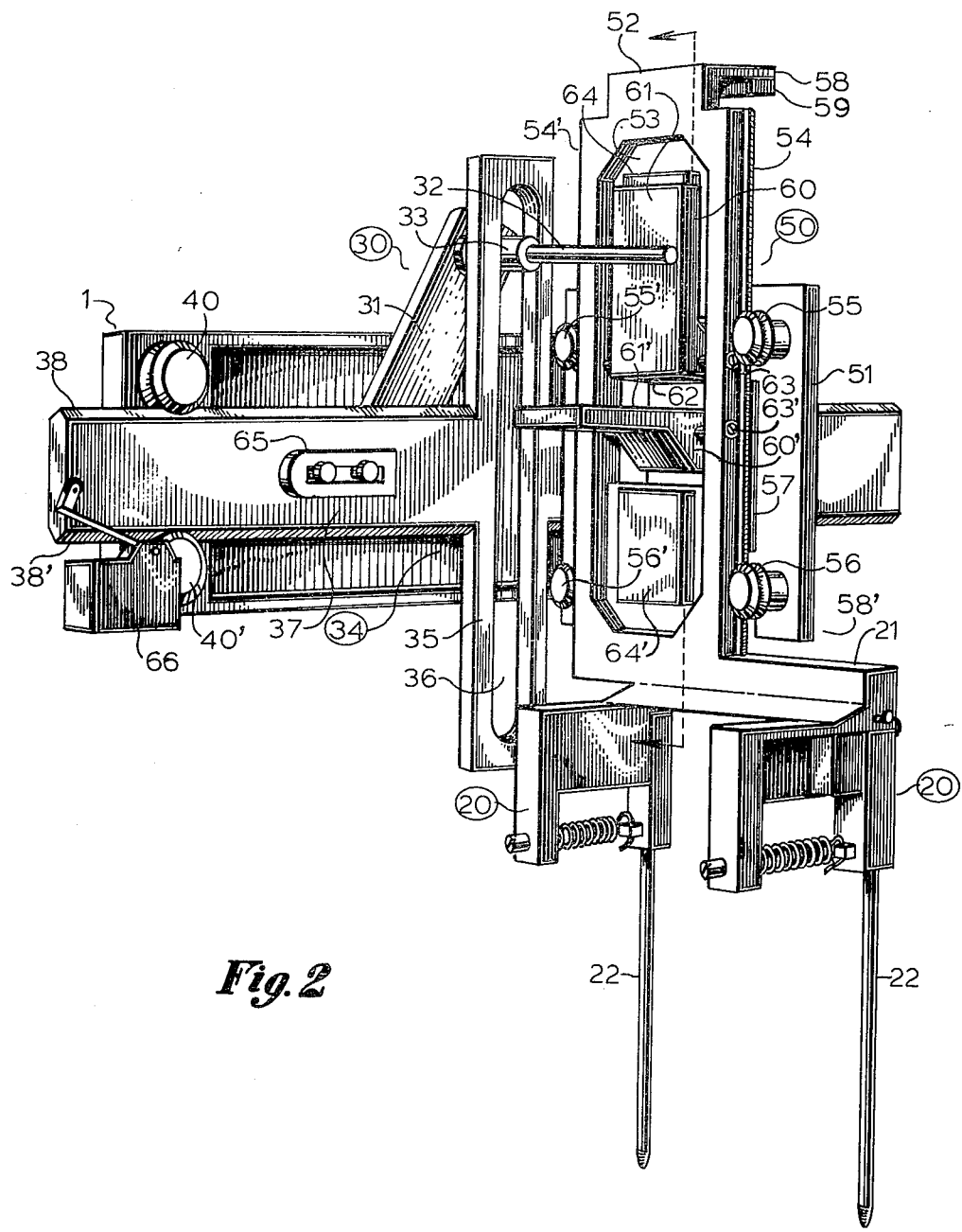
FIG. 2 is a perspective view of the packing assembly.
Figure 3:
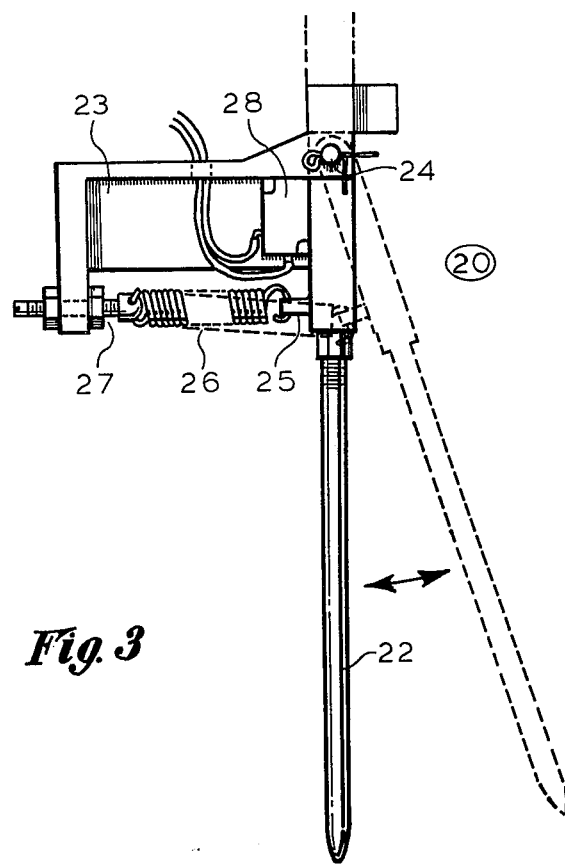
FIG. 3 is a detailed front elevation view of one of the packer finger subassemblies shown in FIG. 2.

The packing assembly 3 shown in FIG. 2 comprises a pair of packer finger subassemblies 20 and a rectangular motion generator 30. The packer finger subassemblies are mounted on support 21 at a spaced-apart distance sufficient to clear the conveyor belts 11 and 11'. As most clearly shown in FIG. 3, each subassembly 20 comprises a packer finger 22 which is sufficiently pointed to intersect the flow of the greens coming off the conveyor assembly 2 without excessively damaging them. The packer finger is pivotally secured to the horizontal arm of L-shaped bracket 23 by pivot pin 24. Below the pivot pin, the packer finger is yieldingly secured through eyelet 25 and spring 26 to threaded spring tension adjuster 27, which in turn is attached to the vertical arm of bracket 23. Mounted on the horizontal arm of bracket 23 adjacent to the packer finger is a force sensing switch 28 which is electrically connected in parallel to the force sensing switch of the other packer finger subassembly.

Figure 4:
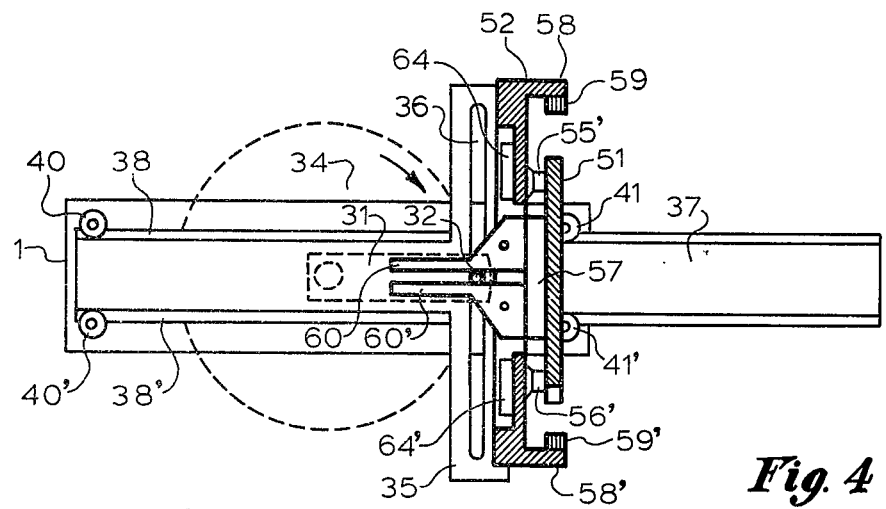
FIG. 4 is a simplified front elevation view of the rectangular motion generator positioned midway in its vertical packing stroke.
Figure 5:
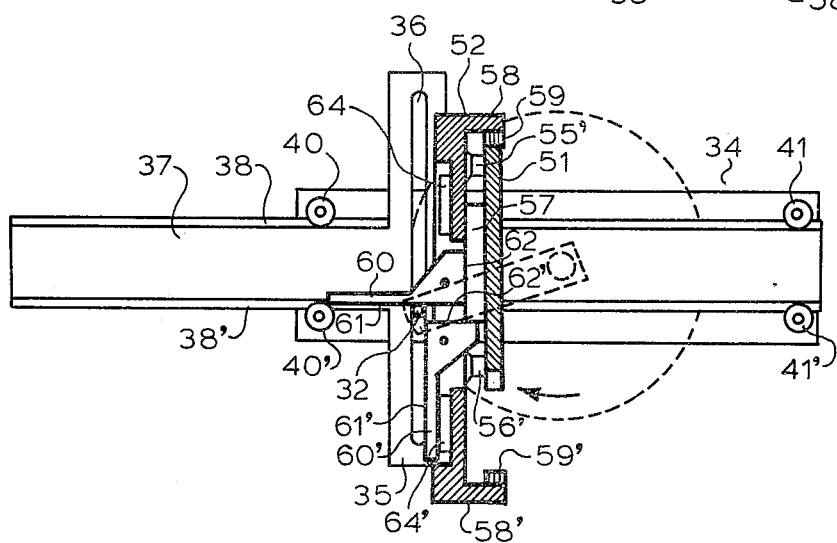
FIG. 5 is a simplified front elevation view of the rectangular motion generator positioned near the end of its horizontal packing stroke.
Figure 6:
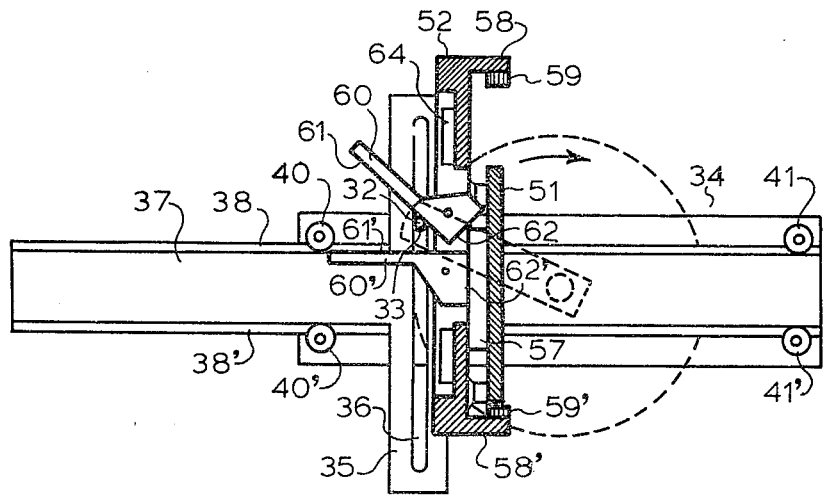
FIG. 6 is a simplified front elevation view of the rectangular motion generator positioned near the end of its vertical return stroke.

In the preferred embodiment of the invention, the path of travel of the packer fingers is controlled by the novel rectangular motion generator shown in detail in FIG. 2 and operatively depicted in FIGS. 4–6. The motion generator 30 comprises a crank 31 mounted on frame 1 and driven by chain drive 6. Secured to the crank is crank pin 32 which is journalled by guide bearing 33 to slot 36 in the vertical arm 35 of Scotch-Yoke mechanism 34. The horizontal arm 37 of the Scotch-Yoke mechanism has upper and lower V-tapered edges 38 and 38', respectively, and is secured for lateral movement between yoke guide bearings 40, 40', 41, and 41' which are mounted on frame 1. The Scotch-Yoke mechanism functions to convert the rotational motion of the crank into reciprocal translation along the line of horizontal arm 37.

Fixed on the horizontal arm 37 alongside the vertical arm 35 in the plane perpendicular to the Scotch-Yoke is the flipper block subassembly 50. This subassembly comprises bracket 51 supporting frame member guide bearings 55, 55', 56, and 56' between which frame member 52 have opening 53 and right and left V-shaped edges 54 and 54', respectively, is secured for vertical movement. Bearing block 57 is also mounted on the bracket in alignment with opening 53 and its ends are within the vertical stroke defined by the crank pin 32. For reasons which will become apparent later, the length of the bearing block should be less than one half the crank stroke. Frame member 52 is equipped with upper stop 58 and lower stop 58', which are cushioned with pieces 59 and 59' of resilient material such as rubber. The upper stop is positioned to engage the top of bracket 51 in order to brake the downward momentum of the frame member 52, and the lower stop is positioned to engage the bottom of bracket 51 in order to brake the upward momentum. Frame member 52 is further equipped with upper flipper block 60 and lower flipper block 60', having crank pin riding surfaces 61 and 61' and bearing block riding surfaces 62 and 62' (shown in FIG. 5), respectively. These flipper blocks are pivotally mounted by pins 63 and 63' within frame opening 53, and are preferably constructed from a durable plastic material such as an ultra-high molecular weight polymer. The flipper blocks are spaced from one another a sufficient distance to accommodate the crank pin 32 when the bearing block riding surfaces 62 and 62' are both flush against the face of bearing block 57 and the crank pin riding surfaces 61 and 61' are parallel. Cushions 64 and 64' assist in braking the momentum of the flipper blocks as they flip over the ends of the bearing block. The flipper block subassembly 50 functions to convert the rotational motion of the crank into reciprocal translation along the vertical line. The packer finger subassembly 20 is attached to frame member 52 by means of support 21.

Attached to the horizontal arm 37 of the Scotch-Yoke 34 is a switch cam 65 oriented to activate positioning switch 66 when the packer fingers are in a predetermined position. Positioning switch 66 is in electrical series with each force sensing switch 28.

Figure 8:
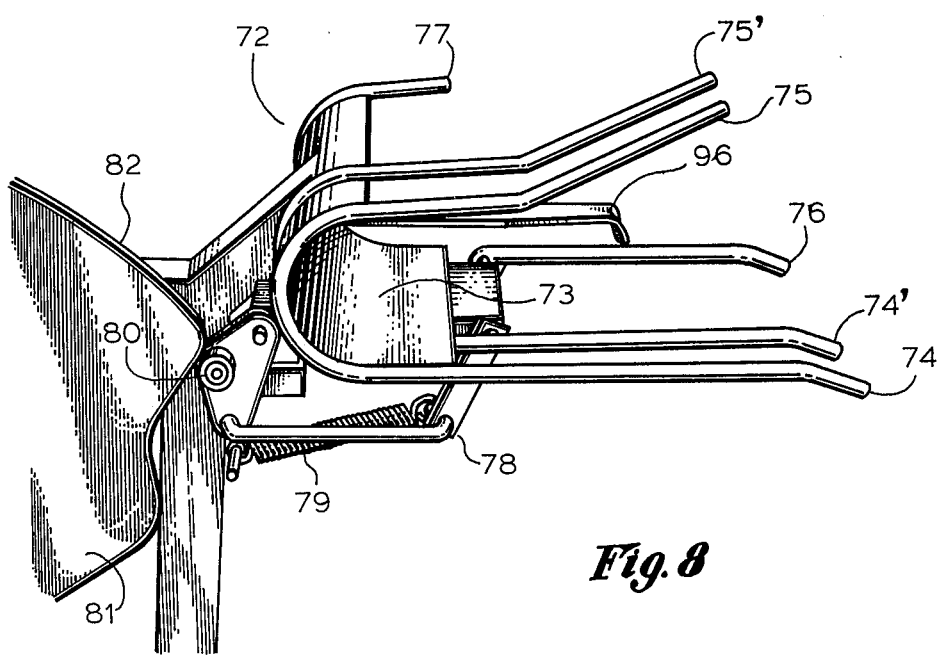
FIG. 8 is a detailed perspective view of one of the accumulator pockets shown in FIG. 7.
Figure 7:
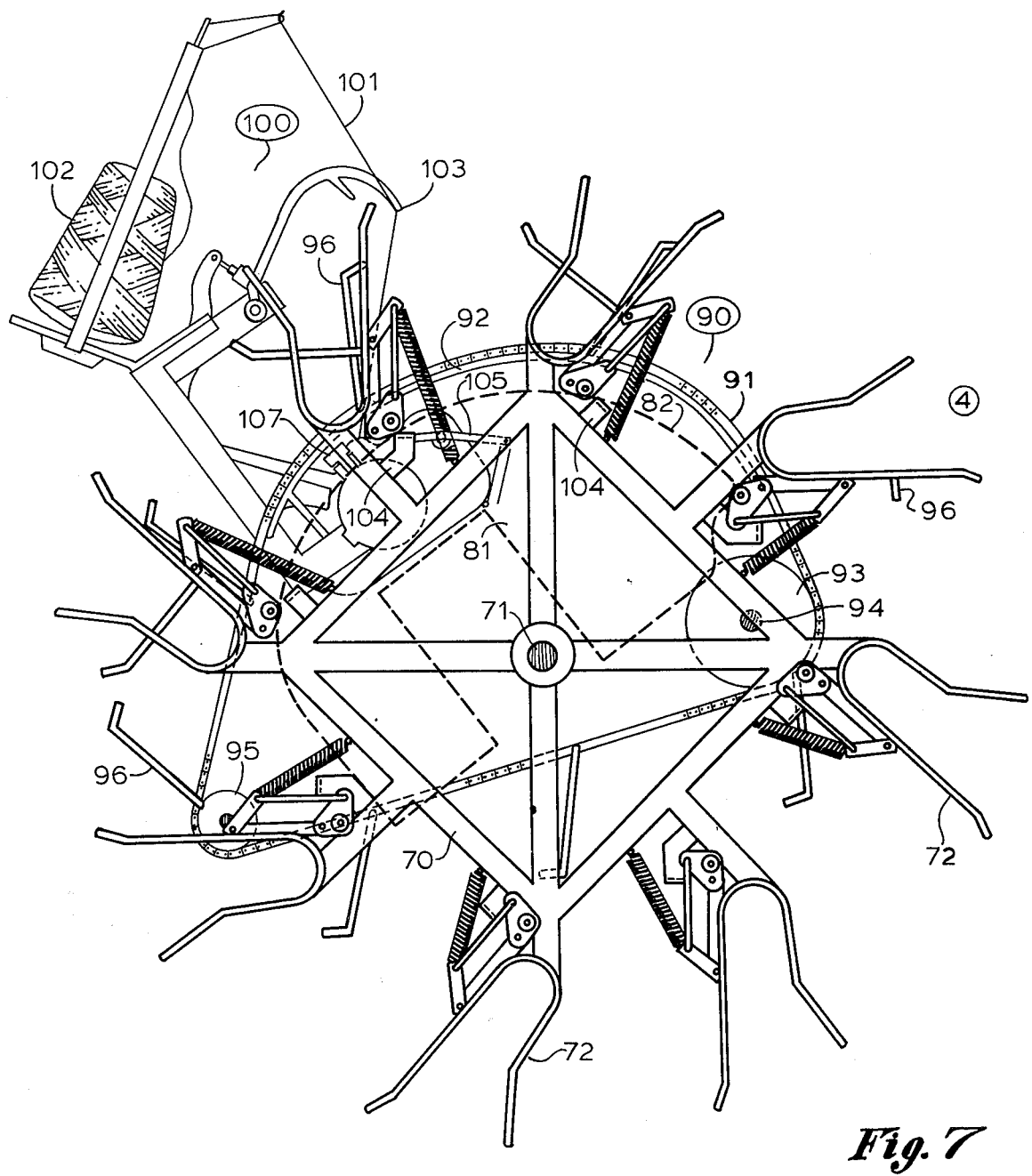
FIG. 7 is a front elevation view of the accumulator pocket assembly with the cam in phantom.

Referring now to FIG. 7, the accumulator pocket assembly 5 comprises as its basic components rotatable pocket wheel 70, cam 81 (removed), stem support system 90, and binding mechanism 100. Rotatable pocket wheel 70 is mounted on shaft 71 which in turn is supported by frame 1. Secured to the wheel are a plurality of accumulator pockets 72 as shown in detail in FIG. 8. Each pocket comprises a semicylindrical inner surface 73, fixed lower guides 74 and 74', fixed upper guides 75 and 75', and movable retainer guide 76. All guides have outwardly tapering ends to assist in funnelling the greens into the pocket. The movable retainer guide 76 is operated by means of a cam-actuated 4-bar linkage 78 mounted on the bottom of the pocket. As cam follower 80 moves around to the top of cam lobe 82 of cam 81, the guide swings through an arc of about 90° from its open position parallel to the lower fixed guides to a closed position near the end of pocket extender 77. In so doing, the guide firmly retains the vegetables in the pocket as a closely packed bunch. Spring 79 returns the movable guide to its open position when the cam follower 80 clears the cam lobe 82. Referring back to FIG. 7, lobe 82 of cam 81 extends approximately half way around the circle of travel defined by each cam follower 80.

The stem support system 90 comprises an endless chain 91 trained on a cam-shaped guide rail 92 which extends from the packing station 4 to just beyond the binding mechanism 100. The chain is driven by secondary stem support system sprocket 93 on shaft 94 in unison with rotatable wheel 70 and is guided from rail 92 to sprocket 93 by means of idler sprocket 95. A positioning plate 96 is secured to the chain 91 opposite each accumulator pocket 72 at an orientation parallel to the plane of the lower guides 74, 74' when the pocket is located at the packing station. As the chain 91 indexes with the rotatable pocket wheel, the cam-shaped guide rail 92 acts to advance the free end of the positioning plate with respect to the accumulator pocket. The effect is that the plate lifts the ends of the greens and orients them into a compact group suitable for binding without obstructing the binding mechanism.

The binding mechanism may be any means as known in the art which will secure the vegetables in a marketable bunch. For purposes of economics and mechanical simplicity, it is preferred to employ a conventional tying device which utilizes string or an elastic cord as illustrated in FIG. 7. The string 101 is fed from spool 102 through typing needle 103 and down between the rotatable pocket wheel 70 and the stem support system 90 to the knotter 107. As the rotatable wheel advances, arm 104 engages switch lever 105 to trigger a one-revolution clutch (not shown) which activates the tying device driven by motor 106 (FIG. 9).

The chain drive mechanism 6 is best depicted in FIG. 9. It is powered by hydraulic motor 110 or other suitable power source mounted on frame 1 and having a power shaft 111. Drive sprocket 112 secured to shaft 111 drives master drive chain 113 around each of idler sprocket 114, primary driven crank sprocket 115 secured to crank shaft 116, and primary driven upper belt sprocket 117 secured to upper driven belt pulley shaft 15'. Also secured to shaft 15' is a secondary driven upper belt sprocket 118 which in turn drives belt synchronizing chain 119 over reversing idler sprocket 120 and driven lower belt sprocket 121 secured to lower driven belt pulley shaft 15. Sprockets 118 and 121 are similarly sized so as to drive upper and lower belt shafts 15' and 15 at the same speed. The belts 11' and 11 will normally be driven at the ground speed of the harvester. Primary crank sprocket 115 is sized smaller than primary upper belt sprocket 117 so that the rectangular motion generator 30 will cycle the packer fingers 22 at a rate greater than the belt feed rate. The effect of this relationship is to prevent accumulation of greens at the packing station and to separate small increments of greens from the belt feed relative to the predetermined bunch size so as to minimize the error in sizing. Also secured to crank shaft 116 are flywheel 130 for maintaining smooth operation of the rectangular motion generator, and a secondary driven crank shaft sprocket 131 for driving the clutch chain 132. This chain travels in a direction reverse of the master drive chain 113 by virtue of reversing idler sprocket 133, and it continuously drives clutch sprocket 134 of the wrap spring clutchbrake mechanism 135. When activated by a built-in solenoid (not shown) the clutch of this mechanism is engaged for a single revolution of clutched shaft 136 having pocket assembly drive sprocket 137 secured thereto. Sprocket 137 drives rotatable wheel sprocket 138 and primary stem support system sprocket 139 by means of accumulator pocket assembly indexing chain 140. Sprocket 138 of course rotates previously described shaft 71 and rotatable pocket wheel 70. Sprocket 139 rotates previously mentioned shaft 94 and secondary stem support system sprocket 93.

OPERATION OF THE INVENTION

In operation, vegetables 8 cut by a mechanical harvester are fed to the conveyor assembly 2 and deposited on the upper flight of lower endless belt 11 where they are loosely held on its surface until firmly gripped by the lower flight of upper endless belt 11'. Belts 11 and 11' are driven in opposite directions at the ground speed of the harvester and convey the vegetables to packing station 4. The chain drive mechanism 6 is geared to turn crank 31 of packing assembly 3 at a speed greater than the conveyor assembly and in the same clockwise direction as upper belt 11' when facing the front of the machine. When the crank is positioned at 3 o'clock as shown in FIG. 4, the crank pin 32 is at the midpoint of vertical arm slot 36 and the entire Scotch-Yoke mechanism 34 is all the way to the right. Both bearing block riding surfaces 62 and 62' of upper and lower flipper blocks 60 and 60', respectively, are riding on the face of the bearing block 57, and the crank pin riding surfaces 61 and 61' are horizontally parallel. The crank pin 32 is pushing against the crank pin riding surface 61' of the lower flipper block. At this point, the rectangular motion generator is midway in its vertical packing stroke. As the crank rotates, and the crank pin continues to push on lower flipper block 60', it forces the frame member 52 and the attached packer finger subassemblies 20 in a substantially vertically downward direction since the crank pin's horizontal component of travel is negligible as compared to the vertical component. During this phase of the cycle, the packer fingers 22 passing on either side of upper belt 11' intersect the flow of the vegetables 8 at the approximate point that the upper and lower belts diverge from one another and release their grip thereon. When the crank pin rotates to about 4 o'clock and its horizontal direction of travel begins to be significant, the lower flipper block 60' swings around the end of the bearing block and the upper stop 58 engages with the top of bracket 51 thereby halting the downward motion of the frame member 52 and packing fingers 22. As the crank continues in its clockwise rotation, crank pin 32 slides along the now vertically oriented crank pin riding surface 61' of the lower flipper block holding it in that position, and the rotary motion is exclusively translated into the lateral motion of the Scotch-Yoke mechanism moving from right to left constituting the horizontal packing stroke of the rectangular motion generator. This action feeds the separated increment of vegetables in advance of the packer fingers into the accumulator pocket 72 positioned at the packing station. As the crank pin passes the 6 o'clock position, it reverses its path along the crank pin riding surface 61' and proceeds unimpeded on its vertical return stroke up slot 36 until it engages crank pin riding surface 61 of upper flipper block 60 (FIG. 5). At this point, the Scotch-Yoke 34 and packer fingers 22 are nearly to the left end of their stroke and lower flipper block 60' is free to flip back to its horizontal position when the frame member 52 is driven upward by the crank pin 32 acting on the upper flipper block 60. At a little before the 10 o'clock position (FIG. 6), the upper flipper block flips over the top end of bearing block 57 and lower stop 58' engages with the bottom of bracket 51 thereby halting the upward vertical motion of the frame member and packing fingers. Support given to the bearing block riding surface 62 of the upper flipper block by the upper end of the bearing block 57 prevents the frame member 52 from gravitationally returning to the lower position as the Scotch-Yoke laterally traverses back to the right to begin another cycle. During this horizontal return stroke, the crank pin slides first upward, then downward along the vertically oriented crank pin riding surface 61 of the uppper flipper block as it did on the lower flipper block during the horizontal packing stroke. Thus the path defined by the tip of each packer finger is substantially rectangular except for slight horizontal movement during the vertical packing and return strokes. The advantages of the fingers following such a path are twofold: (1) they are able to obtain a clean separation of the vegetable increments from the conveyor assembly; and (2) when the accumulator pocket is full, the fingers are able to hold the vegetables therein until the rotatable pocket wheel 70 begins to index and the movable retainer guide 76 flips to the closed position as described below.

The packing assembly repeats this cycle until the force exerted by the predetermined quantity of vegetables on at least one of the packer fingers 22 closes the force sensing switch 28. Then when the fingers are fully to the left of their horizontal packing stroke, serially connected positioning switch 66 is actuated by cam 65 and the wrap spring clutch-brake mechanism 135 is in turn actuated to cause the accumulator pocket indexing chain 140 to index both the rotatable pocket wheel 70 and the stem support system 90 in the counterclockwise direction. As this occurs, the cam follower 80 associated with the accumulator pocket 72 at the packing station rounds the tip of cam lobe 82 causing the movable retainer guide 76 to swing to the closed position as heretofore described. With the advancement of the filled pocket, the free end of the simultaneously advancing positioning plate 96 associated therewith moves forward relative to the pocket, thereby grouping together the ends of the vegetables. The rotatable wheel 50 of the eight pocket assembly depicted in the drawings indexes 45° at a time. This quantum lends itself to a rotation rate sufficient to position an empty pocket at the packing station before the packer fingers return with another increment of leaves, without excessively accelerating the filled pockets to the extent that the leaves become disoriented. The binding mechanism 100 is situated along the circular path of pockets 72 in a position such that it can tie the vegetable bunches when they are stationary. As shown in FIG. 7, it is conveniently located at the 90° mark relative to the packing station. As a pocket is coming to rest at this point, arm 104 triggers the switch lever 105 and a tie is made. The pocket then advances to a point at which cam follower 80 disengages with cam lobe 82 and spring 83 returns movable retainer guide 76 to its open position. The bunched vegetables may be manually or automatically removed from the pockets, and in most instances, they will freely fall out when the pocket rotates to a position in which its opening is oriented downward.

It is understood that the foregoing detailed description is given merely by way of illustration and that modification and variations may be made therein without departing from the spirit and scope of the invention. For example, we have found that the upper flat endless belt 11' may be omitted without seriously hampering the unit's operation. Moreover, it is anticipated that other minor changes may be necessitated by the designs of the various harvesters with which the vegetable buncher will be used.

We claim:
1. An apparatus for use in combination with a mechanical harvester for bunching leafy green vegetables comprising:
  a. means for conveying said leafy greem vegetables to a packing station;
  b. cycling packing means for separating incremental portions of said vegetables from said conveying means and for feeding said portions into one of a plurality of accumulator pockets which are mounted on a rotatable wheel, wherein said one pocket is in a position to receive said vegetables at said packing station;
  c. means for sensing a predetermined quantity of vegetables in said one pocket;
  d. means responsive to said sensing means for rotating said rotatable wheel to position another of said plurality of accumulator pockets to receive said vegetables at said packing station; and
  e. means for binding together said predetermined quantity of vegetables.

2. The apparatus as described in claim 1 wherein said cycling packing means comprises a pair of spaced-apart packer fingers in perpendicular alignment to their direction of travel when feeding the portions of vegetables.

3. The apparatus as described in claim 2 wherein said cycling packing means further comprises a rectangular motion generator for driving each of said packer fingers in a substantially rectangular path.

4. The apparatus as described in claim 3 wherein said rectangular motion generator comprises:
  a. a driven crank having a crank pin;
  b. a Scotch-Yoke mechanism having a first arm adapted for reciprocal movement in a first directional line between opposed yoke guide bearings, and a slotted second arm in the same plane as and perpendicular to said first arm, wherein said second arm is journalled to the crank pin by means of a bearing engaged in the slot of said arm, whereby as the crank rotates, the Scotch-Yoke mechanism converts the rotational motion of the crank into reciprocal translation in said first directional line;
  c. a frame member for supporting the packer fingers and adapted for reciprocal movement in a second directional line between opposed frame member guide bearings mounted on said yoke, wherein said second directional line is parallel to the plane of travel of the crank pin relative to the slotted arm, and wherein the frame member encloses an opening;
  d. a bearing block mounted on said yoke opposite the opening in the frame member with respect to the crank pin and having ends positioned within the stroke of the crank pin in said second directional line; and e. first and second flipper blocks each having a crank pin riding surface and an adjacent bearing block riding surface, wherein said flipper blocks are pivotally mounted within the opening of the frame member and are symmetrically oriented with respect to one another at a distance to accommodate the crank pin between the crank pin riding surfaces when the bearing block riding surfaces are both flush against the face of the bearing block, whereby as the crank pin acts against the crank pin riding surface of one of the flipper blocks, the bearing block riding surface of said one flipper block rides on the face of the bearing block thereby moving the frame member along the second directional line until said one flipper block reaches the end of the bearing block and pivots around said end, thereby permitting the crank pin but not the frame member to continue in said second directional line, and thereby securing the frame member from reversing direction until the crank pin reverses direction in said second directional line and clears the pivot point of said one flipper block.

5. The apparatus as described in claim 4 and further comprising means for stopping the momentum of the frame member after each of the flipper blocks pivots around the corresponding end of the bearing block.

6. The apparatus as described in claim 4 wherein said sensing means comprises at least one force sensing switch which is triggered by pivotal movement of the packer fingers acting against an adjustable biasing means.

7. The apparatus as described in claim 6 wherein said force sensing switch is in series with a positioning switch which is activated only when the packer fingers are in a predetermined position.

8. The apparatus as described in claim 1 wherein each one of the accumulator pockets comprises a substantially semicylindrical inner surface having edges which define the opening to said pocket and a means for directing the vegetables from the conveying means to the opening when said pocket is positioned at the packing station.

9. The apparatus as described in claim 8 wherein said directing means comprises a plurality of guide members extending outwardly from said edges wherein at least one of the guide members is adapted to swing into a closed position across the pocket opening when the rotatable wheel rotates and advances the pocket away from the packing station, and wherein said at least one guide member is further adapted to return to an open position after the pocket advances away from the binding means.

10. The apparatus as described in claim 1 further comprising a means for supporting one end of the vegetables in the accumulator pockets, wherein said means comprises a chain alongside the rotatable wheel having mounted thereon a positioning member adjacent to each of the accumulator pockets, wherein said chain is adapted for synchronized movement with the wheel along a cam-shaped guide rail which causes the free end of each of said positioning members to advance with respect to the corresponding pocket as it advances from the packing station to the binding means.

* * * * *